United States Patent

[11] 3,579,969

| [72] | Inventor | Eugene P. Richter, Jr.<br>R.F.D. #2, Cairo, Ga. 31728 |
|---|---|---|
| [21] | Appl. No. | 872,642 |
| [22] | Filed | Oct. 30, 1969 |
| [45] | Patented | May 25, 1971 |

[54] NUT HARVESTER
10 Claims, 8 Drawing Figs.

[52] U.S. Cl. .................................................. 56/328R
[51] Int. Cl. ............................................ A01d 51/00
[50] Field of Search .......................................... 56/328,
330, 327, 27; 214/356

[56] References Cited
UNITED STATES PATENTS

| 2,441,244 | 5/1948 | Kimball | 56/328R |
|---|---|---|---|
| 2,643,754 | 6/1953 | Doak | 56/328R |
| 2,679,133 | 5/1954 | Soderholm | 56/328R |
| 3,148,493 | 9/1964 | Tubbs | 56/328R |
| 3,387,442 | 6/1968 | Henson | 56/328R |
| 3,475,889 | 11/1969 | Overstreet et al. | 56/328R |

Primary Examiner—Russell R. Kinsey
Attorneys—Clarence A. O'Brien and Harvey B. Jacobson ABSTRACT: Nuts lying on the ground are engaged by chain sections depending from a rotating reel so as to be dragged over a screen flap into a collection trough during forward movement of a mobile harvester frame on which the reel, flap and trough are mounted. The nuts are conveyed laterally through the trough to a delivery conveyor while being aerated.

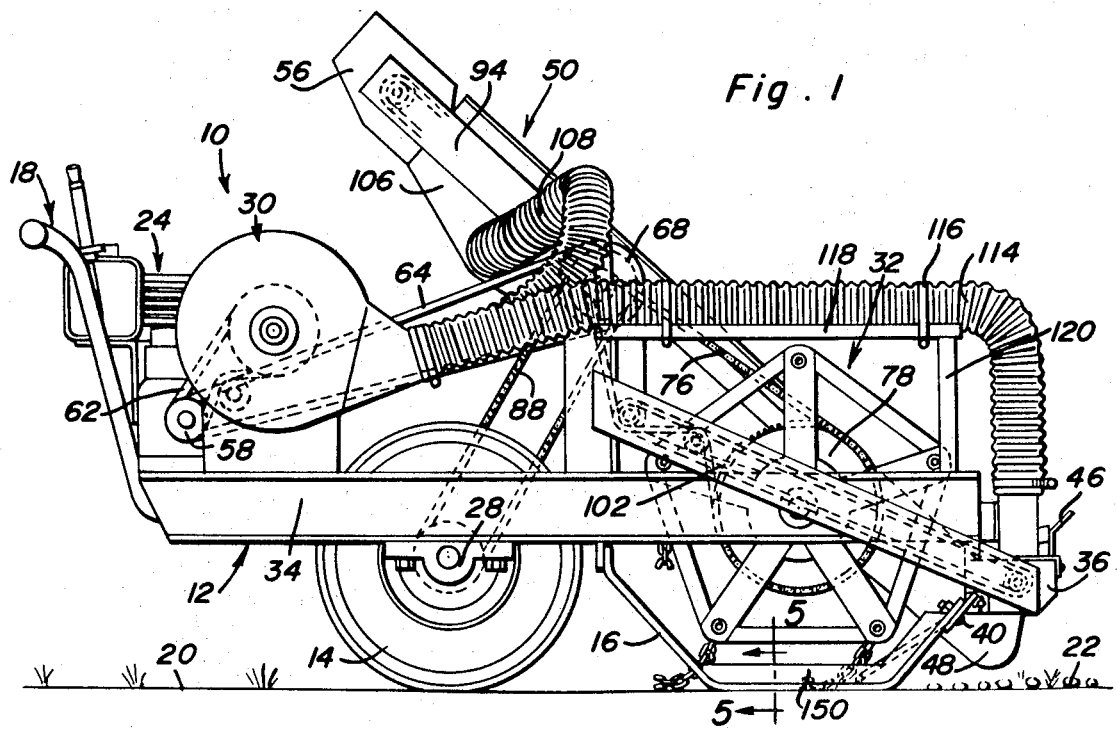
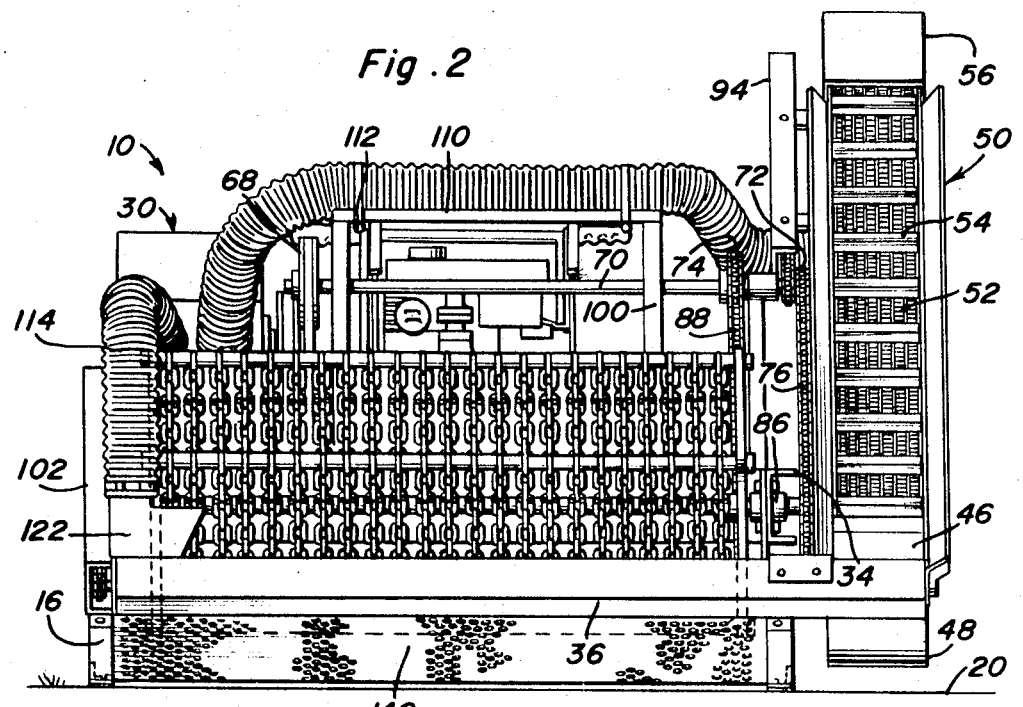
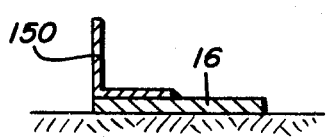

Eugene P. Richter, Jr.
INVENTOR.

BY *Clarence A. O'Brien*
and *Harvey B. Jacobson*
Attorneys

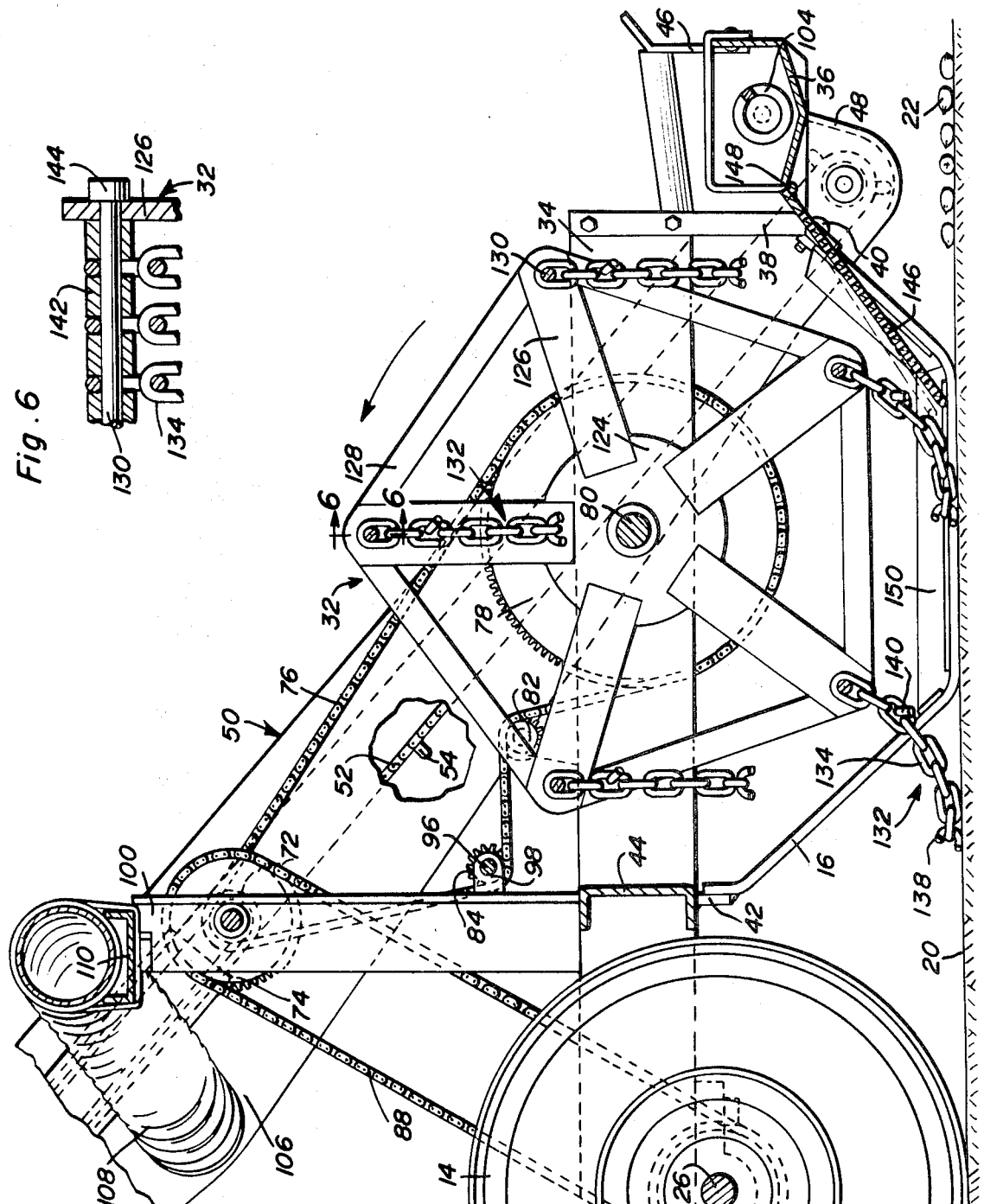

NUT HARVESTER

This invention relates to the harvesting of crops lying on the ground and more particularly to apparatus for harvesting nuts, or the like.

An important object of the present invention is to provide a relatively economical yet effective harvesting device for crops such as nuts lying on the ground.

Nut harvesters have heretofore suffered from various drawbacks including rapid wear of parts, excessive loss of crops due to pickup failure and crop damage. In certain forms of nut harvesters, vacuum pressure is relied upon for pickup purposes requiring ground sealing flaps that wear out causing a reduction in vacuum and pickup effectiveness. In other types of nut harvesters, impact engaging elements on high-speed reels are relied upon for pick up causing crop damage particularly to thin shell types of nuts.

In accordance with the present invention, a harvesting machine is provided wherein nuts are picked up by engagement with ground sweeping chain sections depending from a rotating reel causing the nuts to be dragged upwardly over a resilient screen flap and deposited within a collection trough mounted by the harvester frame forwardly of the rotating reel. The reel is rotated at a relatively low speed as compared to prior pickup reels while the drag chain sections are maintained under tension by weighted spurs. A relatively gentle yet effective pickup action is thereby realized. The nuts collected within the collection trough are conveyed laterally by an auger conveyor to the lower end of an upwardly inclined delivery conveyor at one lateral side of the harvester frame. A blower is mounted on the frame with conduits extending therefrom for aerating the material within the collection trough and the delivery conveyor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of a nut harvester constructed in accordance with the present invention.

FIG. 2 is a front elevational view of the harvester shown in FIG. 1.

FIG. 4 is an enlarged partial sectional view taken substantially through a plane indicated by section line 4–4 in FIG. 3.

FIG. 5 is an enlarged partial sectional view taken substantially through a plane indicated by section line 5–5 in FIG. 1.

FIG. 6 is an enlarged partial sectional view taken substantially through a plane indicated by section line 6–6 in FIG. 4.

Figure 3:
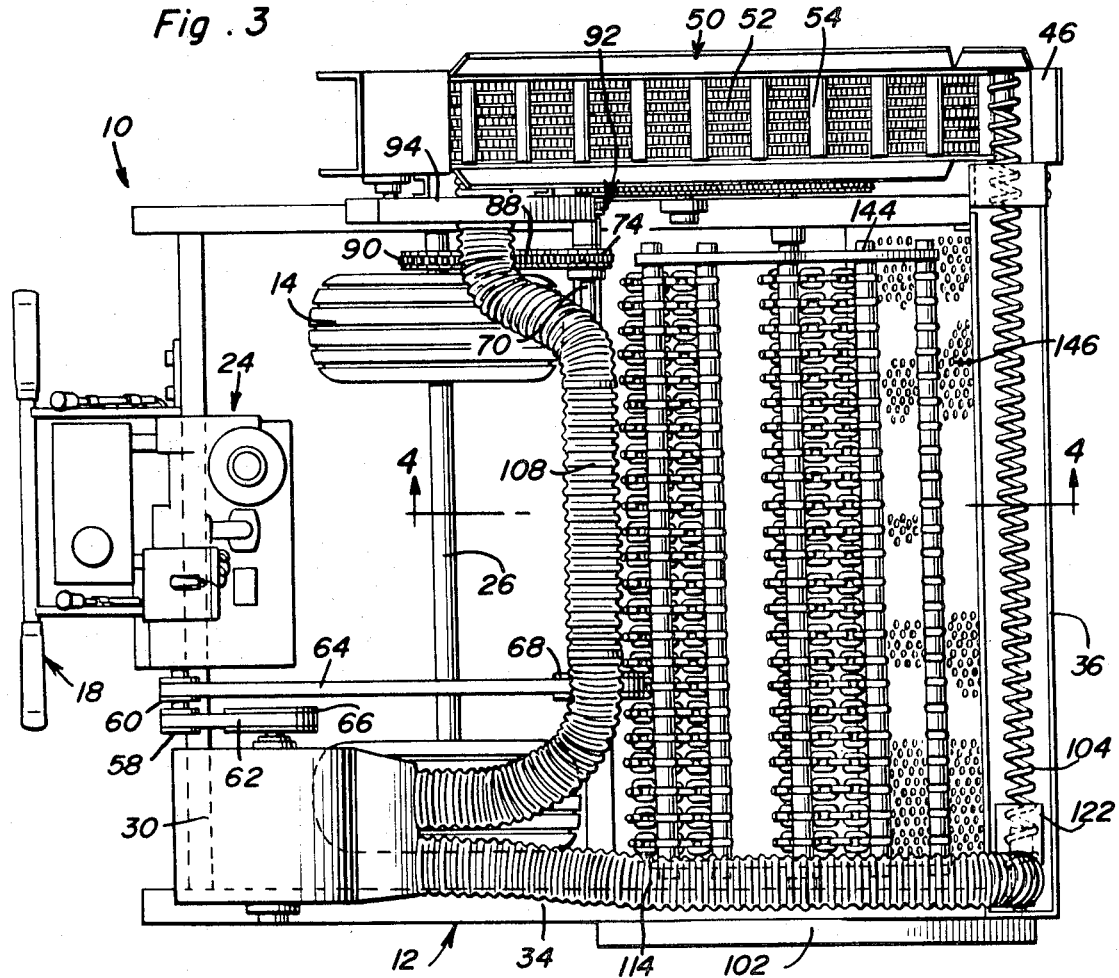
FIG. 3 is a top plan view of the harvester shown in FIGS. 1 and 2.

Referring now to the drawings in detail, FIGS. 1, 2 and 3 illustrate a nut harvester generally referred to by reference numeral 10 which is constructed in accordance with the present invention. The harvester includes a mobile frame generally denoted by reference numeral 12 supported above the ground by a pair of rubber tired wheels 14 and a pair of skid elements 16 depending from the frame forwardly of the wheels 14. A handle bar assembly 18 is connected to the rear end of the frame to permit the operator to directionally guide movement of the harvester over the ground 20 for harvesting crops such as nuts 22.

In the illustrated embodiment, the mobile frame of the harvester is self-propelled and toward this end, an internal combustion engine type of power plant assembly 24 is mounted at the rear end of the frame substantially aligned with a central longitudinal axis thereof between the laterally spaced wheels 14 which are interconnected by a drive axle 26 supported by bearing assemblies 28 secured to the frame and depending therefrom on the laterally outer sides of the wheels.

The frame mounts a blower device 30 adjacent the rear end at one lateral side of the power plant 24. A pickup reel assembly 32 is mounted forwardly of the wheels 14 and extends laterally between the side frame members 34 of the frame from which the bearing assemblies 28 and skid elements 16 depend. The skid elements 16 are aligned at opposite axial ends of the reel assembly so as to precisely space the reel assembly above the ground for proper pick up of nuts as will be explained in detail hereafter. At the forward end of the frame, a laterally extending collection trough 36 is fixedly mounted by support bars 38 secured to and depending from the forward ends of the side frame members 34 as shown in FIG. 4. The collection trough extends between the support bars at locations spaced from the opposite axial ends of the reel assembly. The skid elements 16 are secured at these locations to the frame by means of skid bolts 40 and by welding to depending lugs 42 on the underside of cross frame member 44 interconnecting the side frame members 34 of the frame intermediate the forward and rear ends thereof as also shown in FIG. 4. One lateral end of the collection trough 36 extends beyond the frame to a rearwardly opening, outlet portion 46 overlying the lower inlet portion 48 of an upwardly inclined delivery conveyor 50 fixedly mounted by the frame on one lateral side thereof. The delivery conveyor includes an endless, chain link type of belt 52 having spaced cleats 54 mounted thereon for movement upwardly and rearwardly along its upper run toward an outlet end portion 56 from which the harvested crop is discharged into a collection bin (not shown).

The output shaft of the power plant as shown in FIG. 3, is provided with a pair of drive pulleys 58 and 60 about which drive belts 62 and 64 are entrained to respectively operate the blower 30 through the driven pulley wheel 66 and the reel assembly 32 as well as to propel the frame forwardly by imparting rotation to the wheels 14. The drive belt 64 is accordingly entrained about a driven pulley 68 connected to one end of a drive shaft 70 opposite the end to which the sprocket wheels 72 and 74 are connected as more clearly seen in FIGS. 2, 3 and 4. The sprocket wheel 72 is drivingly connected by the sprocket chain 76 to a reel sprocket 78 connected to one end of a reel shaft 80 associated with the reel assembly 32 for imparting rotation thereto in a counterclockwise direction as viewed in FIGS. 1 and 4. The sprocket chain 76 is entrained about idler sprockets 82 and 84 respectively carried by the frame assembly in proper position. Thus, the reel assembly is rotated about its shaft 80 in the proper direction and at a relatively low speed about a horizontal axis established for the shaft 80 by a pair of bearing assemblies 86 carried by the side frame members 34. The sprocket wheel 74 on the other hand has an endless sprocket chain 88 entrained thereabout drivingly connecting it to a sprocket wheel 90 secured to the drive axle 26 adjacent one of the wheels 14 as more clearly seen in FIG. 3. The harvester frame is accordingly propelled in a forward direction at the same time that the reel assembly is rotated in the proper direction.

The drive shaft 70 is also drivingly connected by a sprocket drive to a drive sprocket at the upper outlet end of the delivery conveyor 50, this sprocket drive being generally referred to by reference numeral 92 and protectively enclosed by a shield 94 alongside of the upper portion of the delivery conveyor. The idler sprocket 84 associated with the sprocket drive to the reel assembly, as shown in FIG. 4, is connected to one end of a shaft 96 rotatably supported by supports 98 projecting forwardly from frame posts 100. The shaft 96 at an end opposite the idler sprocket 84, is connected to the input end of an endless drive belt transmission enclosed by the shield 102 as shown in FIGS. 1 and 3 so as to impart rotation to one lateral end of an auger screw conveyor 104 disposed within the collection trough 36. Thus, nuts collected within the trough will be conveyed laterally toward the outlet end portion 46 of the trough and be deposited into the lower inlet end portion 48 of the delivery conveyor 50 between the cleats 54 on the upwardly moving run of the link chain belt 52.

As the nuts are being conveyed upwardly by the delivery conveyor, the nuts are aerated or fluidized for removal of debris, by an upward blast of air through the link chain belt 52. Toward this end, the underside of the delivery conveyor is provided with a manifold 106 as more clearly seen in FIGS. 1 and 4 to which the discharge end of a flexible hose 108 is connected. The hose extends laterally across the frame and is supported on top of a support channel 110 to which it is clamped by hose clamps 112, the support channel being mounted at the upper ends of the frame posts 100 as more clearly seen in FIG. 2. The inlet end of the flexible hose 108 is connected to one of the two outlets of the blower 30, the other outlet being connected to the inlet end of another flexible hose 114 which extends along one lateral side of the frame. The hose 114 is therefore clamped by hose clamps 116 to a support channel 118 secured to the upper ends of frame posts 120 extending upwardly from the side frame member 34 as more clearly seen in FIG. 1. The outlet end of the hose 114 is connected to an exhaust duct 122 discharging air laterally and downwardly into the collection trough 36 as more clearly seen in FIG. 2 in order to aerate and assist lateral displacement of the harvested nuts by the auger conveyor 104.

Figure 7:
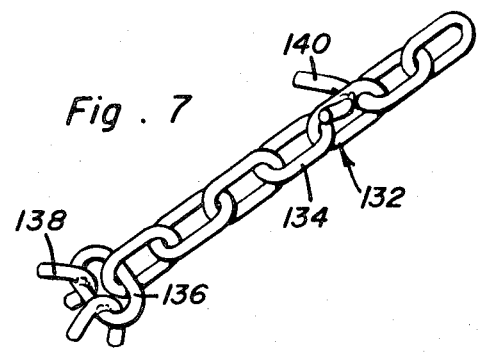
FIG. 7 is a perspective view of one of the chain sections associated with the nut harvester.

The reel assembly 32, as more clearly seen in FIG. 4, includes a pair of hubs 124 from which a plurality of radial arms 126 extend in equiangular-spaced relation to each other. In the illustrated embodiment, there are five radial arms 126 welded to the hub 124 adjacent each end of the reel shaft 80, the radial arms being interconnected at their radially outer ends by bars 128 to enclose a pentagon configuration. The radially outer end portions of the arms 126 adjacent opposite ends of the reel shaft 80, are interconnected by rods 130. Each rod 130 supports a plurality of laterally spaced chain sections 132 depending therefrom. Each of the chain sections 132 is made up of chain links 134 and as more clearly seen in FIG. 7, the chain link 136 at the end of the chain section opposite its supporting rod 130, has a pair of spurs 138 welded thereto. Another spur 140 is welded to the third chain link from the rod 130. Also, as shown in FIG. 6, the chain sections 132 on each rod 130 are spaced from each other by spacer sleeves 142. The rods 130 are held assembled between the radial arms 126 by means of collars 144 secured to the ends thereof on the outside of the arms.

As hereinbefore indicated, the skid elements 16 disposed adjacent the opposite axial ends of the reel assembly space the radially outer ends of the arms 126 in their lowermost positions a precise distance above the ground such as 2 inches so that the chain sections 132 are dragged along the ground as the reel assembly is rotated. The weight of the spurs 138 and 140 maintain a proper gravitational tension on the chain sections as they are dragged along in contact with the ground. When dragged along the ground in this manner, the chain sections effectively engage the nuts 22 as the reel assembly passes thereover during forward movement of the harvester frame. The nuts are thereby dragged forwardly by the chain sections and upwardly over a foraminous ramp surface formed by a flexible screen flap 146. The screen flap is anchored by a rod 148 to the rear edge of the collection trough 36 as more clearly seen in FIG. 4 and extends downwardly and rearwardly at approximately 45° terminating at a rear edge slightly spaced above the ground. The screen 146 extends laterally below the forward portion of the reel assembly between the skid elements 36 which are provided with shields 150 as more clearly seen in FIGS. 4 and 5 in order to confine the nuts to the pickup action of the reel assembly. Accordingly, as the harvester moves forwardly, the nuts 22 pass under the screen flap which may flex upwardly and are then engaged by the forwardly moving chain sections 132.

Figure 8:
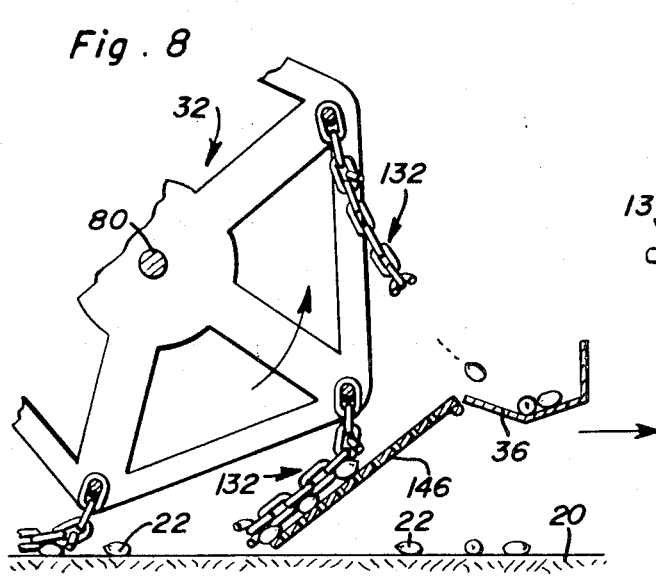
FIG. 8 is a partial side sectional view somewhat in diagrammatic form showing the pickup action associated with the nut harvester of the present invention.

As shown in FIG. 8, the gravitationally tensioned chain sections engage the nuts 22 and drag them forwardly and then upwardly over the screen ramp 146. Small particles and debris may drop through the apertures in the screen. As the chain sections are displaced upwardly away from the screen 146, the nuts are deposited within the collection trough 36. Because of the direction in which the reel assembly is rotated causing forward movement of the drag chain sections 132, the reel assembly may be rotated at a relatively low speed as compared to pickup reel assemblies in prior art harvesting machines. The relatively low speed of rotation is furthermore warranted in view of the more positive engagement of the nuts by the chain sections dragging the nuts forwardly over the foraminous ramp screen 146 to deposit the nuts into the collection trough 36 without any impact so as to minimize damage to thin shelled nuts. The effectiveness of the chain sections in engaging the nuts is enhanced by the tension imposed thereon by the weight of the spurs and their contact with the ground.

The foregoing is considered as illustrative only of the prinicples of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. A harvesting machine for crops lying on the ground comprising a mobile frame adapted to be propelled forwardly, reel means mounted on the frame for rotation in spaced relation to the ground, a plurality of flexible elements depending from the reel means, a collection trough fixedly mounted on the frame forwardly of the reel means, ramp means extending rearwardly and downwardly from the collection trough and drag means mounted on the flexible elements for tensioning the flexible elements in response to contact with the ground during rotation of the reel means to engage and drag the crops upwardly over the ramp means into the collection trough.

2. The combination of claim 1 wherein said flexible elements are link chain sections and said drag means include spurs secured to the chain sections at free ends thereof.

3. The combination of claim 2 including conveyor means for displacing the crops laterally through the collection trough, delivery means for upwardly and rearwardly conveying the crops from the collection trough, blower means mounted on the frame and conduit means connected to the blower means for assisting lateral displacement of the crops and fluidizing the same within the delivery means.

4. The combination of claim 3 wherein said ramp means comprises a flexible, foraminous flap.

5. The combination of claim 4 including skid means fixedly mounted by the frame for supportingly spacing the reel means above the ground.

6. The combination of claim 1 wherein said ramp means comprises a flexible, foraminous flap.

7. The combination of claim 6 including skid means fixedly mounted by the frame for supportingly spacing the reel means above the ground.

8. The combination of claim 1 including conveyor means for displacing the crops laterally through the collection trough, delivery means for upwardly and rearwardly conveying the crops from the collection trough, blower means mounted on the frame and conduit means connected to the blower means for assisting lateral displacement of the crops and fluidizing the same within the delivery means.

9. A harvesting machine for crops lying on the ground comprising a mobile frame adapted to be propelled forwardly, reel means mounted on the frame for powered rotation, a plurality of link chain sections depending from the reel means, a collection trough fixedly mounted on the frame forwardly of the reel means, and drag means mounted on the chain sections for tensioning the same in response to contact with the ground during rotation of the reel means to engage and drag the crops into the collection trough.

10. The combination of claim 9 including skid means fixedly mounted by the frame for supportingly spacing the reel means above the ground.